W. H. YARBOROUGH.
EARTH-BORING APPARATUS.

No. 184,685. Patented Nov. 21, 1876.

Witnesses:
M. O. Callahan
J. M. Willson

Inventor:
William H. Yarborough

UNITED STATES PATENT OFFICE.

WILLIAM H. YARBOROUGH, OF SHERMAN, TEXAS.

IMPROVEMENT IN EARTH-BORING APPARATUS.

Specification forming part of Letters Patent No. 184,685, dated November 21, 1876; application filed October 11, 1875.

*To all whom it may concern:*

Be it known that I, WILLIAM H. YARBOROUGH, of Sherman, in the county of Grayson and State of Texas, have invented a new and useful Improvement in Well-Boring Machines, which improvement is fully set forth in the following specification, reference being had to the accompanying drawings.

Figure 1:
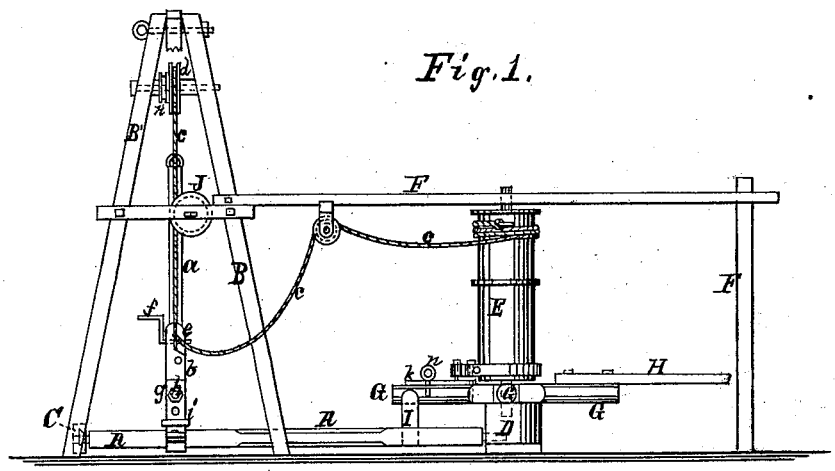
Figure 2:
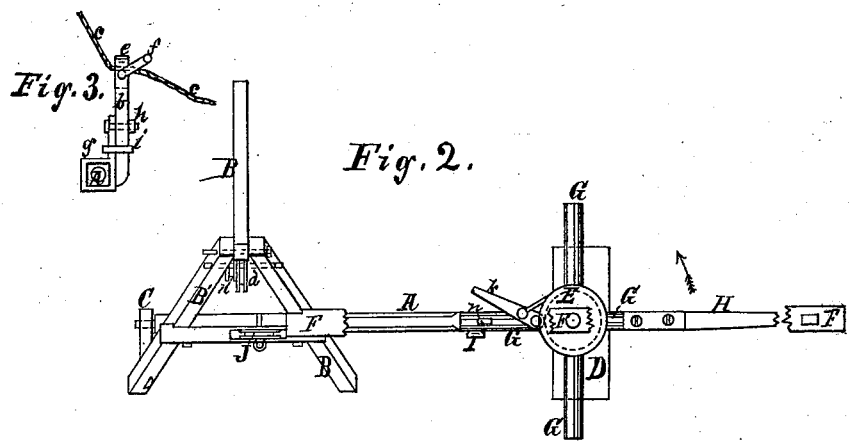

The object of my invention is to rapidly bore through earth or rock holes of any desired size or depth, for the purpose of procuring water. This I am enabled to accomplish by the combination, in a well-boring machine, of an auger and a rope, or its equivalent, with an arm, $b$, and horizontal shaft A, together with the windlass and other mechanism for operating the same, as shown in the side elevation, Figure 1, and plan view, Fig. 2, of the accompanying drawing.

Figure 3:
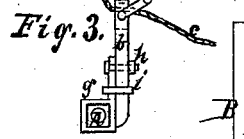

Fig. 3 is a view of the arm $b$ and a clamp for securing the rope.

$a$ is the stem of the auger, which is simply a shaft of iron, five or six feet in length, with a hole in one end, into which are screwed forked arms, for supporting the auger, which is in the form of a hollow cylinder. At the top of the auger-shaft is an eye, into which is secured a rope, $c$, which passes up and over a deeply-grooved sheave-wheel, $d$, that is secured near the top of the derrick B.

This derrick should be placed so that when the auger is thus suspended it will hang directly over where it is desired to sink the well.

The rope, after passing over the sheave, extends downward, and is clamped by a jaw, $e$, that is opened or closed by a screw upon the crank $f$. The latter passes through the wooden arm $b$, which is perforated as represented, to render it adjustable as to height, and may be attached to the iron arm $g$, as in the illustration, by a bolt, $h$, and strap $i$, to provide for regulating the stroke of the auger or drill. The iron arm $g$ gradually tapers toward the top, and is bent at the bottom end to fit the square horizontal shaft A. This shaft is of wood, and lies near the ground, so that the animal working the machine may pass over it without difficulty, and it is journaled at one end to a piece of timber, C, framed in the base of derrick-leg B', and at the other in the sill-block D. The windlass E also turns in a bearing formed in the top of this sill. The other end has its bearing in a simple frame, F. The arms G are secured in place by the bottom bearing of windlass E, which passes through the center of them; but they turn independent of it, and when a horse is attached to the draft-lever H, and it is moved in the direction indicated by the arrow, they come in contact with the arm I, that is secured to the horizontal shaft, and it is rocked to one side, raising the auger to a sufficient height in the well, when it passes over, allowing the auger to drop, rocking the horizontal shaft back again in position to receive another stroke from the approaching arm. This is continued until the tubular portion of the auger is filled with earth, which will take from five to twelve strokes, according to the nature of the ground. The rope is then detached from jaw $e$, passed under sheave J, and the brake-lever $k$ is brought around and secured by pin $n$, thus firmly coupling the arms G and windlass E together. The horse then being started again in the same direction will turn the windlass and wind the rope around it, when the auger, filled with earth, will be drawn from the well.

The earth being removed, the brake-lever $k$ is slackened, and the auger allowed to descend again to the bottom, when the rope is again clamped by the jaw $e$, and the operation repeated.

For drilling through rock, the tubular auger is detached, and in its place a Z or other well-known rock-drill is secured and operated in the same manner as the auger, being raised and dropped upon the rock until a quantity is chipped off, when it may be drawn out and a bucket lowered by a rope passing over sheave $n$, and the pulverized rock and water drawn up.

I do not claim the auger herein mentioned, but describe it in order to more fully illustrate the working of my invention; but What I do claim as new, and desire to secure by Letters Patent, is—

1. In combination with the rock-shaft A, the arms b and I, when constructed and operated as and for the purpose herein set forth.

2. In a well-boring machine, the windlass E and arms G, when constructed and arranged to operate a rock-shaft, as herein specified.

WILLIAM H. YARBOROUGH.

Witnesses:
M. O'CALLAHAN,
J. M. WILSON.